(12) United States Patent
Zhao et al.

(10) Patent No.: US 12,386,666 B2
(45) Date of Patent: Aug. 12, 2025

(54) WORKING METHOD AND DEVICE FOR DEEP LEARNING TRAINING TASK

(71) Applicant: Guangdong Inspur Smart Computing Technology Co., Ltd., Guangzhou (CN)

(72) Inventors: Renming Zhao, Guangzhou (CN); Pei Chen, Guangzhou (CN)

(73) Assignee: GUANGDONG INSPUR SMART COMPUTING TECHNOLOGY CO., LTD., Guangzhou (CN)

( * ) Notice: Subject to any disclaimer, the term of this patent is extended or adjusted under 35 U.S.C. 154(b) by 569 days.

(21) Appl. No.: 17/761,877

(22) PCT Filed: Dec. 30, 2019

(86) PCT No.: PCT/CN2019/129995
§ 371 (c)(1),
(2) Date: Mar. 18, 2022

(87) PCT Pub. No.: WO2021/051713
PCT Pub. Date: Mar. 25, 2021

(65) Prior Publication Data
US 2023/0333898 A1    Oct. 19, 2023

(30) Foreign Application Priority Data

Sep. 20, 2019  (CN) .......................... 201910894815.1

(51) Int. Cl.
*G06F 9/50* (2006.01)
*G06F 9/54* (2006.01)
(52) U.S. Cl.
CPC ............ *G06F 9/5027* (2013.01); *G06F 9/547* (2013.01)
(58) Field of Classification Search
USPC ....................................................... 718/105
See application file for complete search history.

(56) References Cited

U.S. PATENT DOCUMENTS

2013/0198755 A1   8/2013   Kim et al.
2016/0110228 A1   4/2016   Zhang
(Continued)

FOREIGN PATENT DOCUMENTS

CN    103699440 A    4/2014
CN    105573827 A    5/2016
(Continued)

OTHER PUBLICATIONS

English translation of the First Office Action of corresponding KR Application No. KR10-2022-7010633.
(Continued)

*Primary Examiner* — April Y Blair
*Assistant Examiner* — Ross Michael Vincent
(74) *Attorney, Agent, or Firm* — Maschoff Brennan

(57) ABSTRACT

A working method and device for a deep learning training task. GPUs are allocated to multiple deep learning training tasks according to the remaining resources of the GPUs in a single server node or multiple server nodes to achieve the effect of considering multiple deep learning training tasks while ensuring the utilization rate of the GPUs. The method comprises: obtaining a deep learning training task parameter input by a user; determining the type of the deep learning training task from the task parameter, the type of the deep learning training task type comprising: single model and multi-model; selecting GPUs by different policies according to different deep learning training task types; and selecting, according to the position of the GPU, a CPU having a shortest communication distance from the GPU for working.

7 Claims, 9 Drawing Sheets

(56) References Cited

U.S. PATENT DOCUMENTS

| | | | |
|---|---|---|---|
| 2018/0307984 A1 | 10/2018 | Koker et al. | |
| 2018/0322386 A1 | 11/2018 | Sridharan et al. | |
| 2019/0102169 A1* | 4/2019 | Yamazaki | G06N 3/063 |
| 2019/0205737 A1* | 7/2019 | Bleiweiss | G06N 3/084 |
| 2019/0312772 A1* | 10/2019 | Zhao | G06F 9/5011 |
| 2019/0324805 A1* | 10/2019 | Peng | G06F 9/5005 |
| 2020/0042362 A1* | 2/2020 | Cui | G06V 10/82 |
| 2020/0134461 A1* | 4/2020 | Chai | G06N 3/084 |

FOREIGN PATENT DOCUMENTS

| | | |
|---|---|---|
| CN | 106878439 A | 6/2017 |
| CN | 106919442 A | 7/2017 |
| CN | 108805798 A | 5/2018 |
| CN | 108460457 A | 8/2018 |
| CN | 109660526 A | 4/2019 |
| CN | 109918199 A | 6/2019 |
| CN | 110231976 A | 9/2019 |

OTHER PUBLICATIONS

Written Opinion of the International Searching Authority and its English translation in reference to Chinese Application No. PCT/CN2019/129995 filed Dec. 30, 2019.

First search of Chinese congeners in reference of Chinese Application No. 2019108948151 filed Sep. 20, 2019.

International Search Report and its English translation in reference to Chinese Application No. PCT/CN2019/129995 filed Dec. 30, 2019.

* cited by examiner

|  | GPU1 | GPU2 | GPU3 | GPU4 | GPU5 | GPU6 | GPU7 | GPU8 |
|---|---|---|---|---|---|---|---|---|
| GPU1 | self | NV | NV | NV | SYS | SYS | NV | SYS |
| GPU2 | NV | self | NV | NV | SYS | SYS | SYS | NV |
| GPU3 | NV | NV | self | NV | NV | NV | SYS | SYS |
| GPU4 | NV | NV | NV | self | SYS | SYS | SYS | SYS |
| GPU5 | SYS | SYS | NV | SYS | self | NV | NV | NV |
| GPU6 | SYS | SYS | SYS | NV | NV | self | NV | NV |
| GPU7 | NV | SYS | SYS | SYS | NV | NV | self | NV |
| GPU8 | SYS | NV | SYS | SYS | NV | NV | NV | self |

Fig. 4

|       | NODE1     | NODE2     | NODE3     | NODE4 | NODE5 |
|-------|-----------|-----------|-----------|-------|-------|
| NODE1 | self      | Ethernet1 | Ehternet2 | X     | X     |
| NODE2 | Ethernet1 | self      | Ehternet2 | X     | X     |
| NODE3 | Ehternet2 | Ehternet2 | self      | IB1   | IB2   |
| NODE4 | X         | X         | IB1       | self  | IB2   |
| NODE5 | X         | X         | IB2       | IB2   | self  |

Fig. 7

WORKING METHOD AND DEVICE FOR DEEP LEARNING TRAINING TASK

CROSS REFERENCE TO RELATED APPLICATIONS

This application is a $371 National Stage Entry of International Application No. PCT/CN2019/129995, filed Dec. 30, 2019, and claims priority to China Patent Application No. 201910894815.1, filed on Sep. 20, 2019 in China National Intellectual Property Administration and entitled "WORKING METHOD AND APPARATUS FOR DEEP LEARNING TRAINING TASK", each of which is hereby incorporated by reference in its entirety.

TECHNICAL FIELD

The present application relates to the field of deep learning, in particular to a working method and apparatus for a deep learning training task.

BACKGROUND

A deep learning training technology is a new technology that is developing very rapidly. As the data volume used for deep learning training tasks increases and the requirements for the training speed increase, the demand for hashrate also increases significantly. The demand of training tasks for basic resources has evolved from single-server single-graphic processing unit (GPU) training to single-server multi-GPU training and multi-server multi-GPU training, and the overall scale of GPU server clusters is also increased significantly.

As a resource that has a high utilization rate in a cluster and is scarcer than a central processing unit (CPU) and a memory, GPU's utilization rate usually decides the overall efficiency of a deep learning training task. However, how to take both single-machine tasks and multi-machine tasks into account while ensuring the utilization rate of the GPU has become a problem to be urgently solved. There is a lack of a working method for a deep learning training task that can solve the above problems in the prior art.

SUMMARY

In order to solve the above-mentioned technical problems in the prior art, the present application provides a working method and apparatus for a deep learning training task. Reasonable allocation of remaining resources in GPUs in a single-server node and a multi-server node solves the problem in the prior art that ensuring the utilization rate of the GPU and taking both single-machine type tasks and multi-machine type tasks into account cannot be achieved at the same time.

The present application provides a working method for a deep learning training task, including:
  obtaining deep learning training task parameters input by a user;
  determining a type of the deep learning training task from the task parameters, the type of the deep learning training task including a single-machine type and a multi-machine type;
  selecting, according to the deep learning training task parameters, a GPU that satisfies the deep learning training task parameters and has a minimum remaining resource quantity from a single server node to work when the task type is the single-machine type;
  firstly selecting, according to the deep learning training task parameters, a GPU that satisfies the deep learning training task parameters and has a minimum remaining resource quantity from a single server node to work when the task type is the multi-machine type; selecting a GPU that satisfies the deep learning training task parameters and has a minimum remaining resource quantity from a combination of a plurality of server nodes to work if there is no single server node that satisfies the condition; and
  selecting, according to a position of the GPU, a CPU having a shortest communication distance from the GPU to work.

Optionally, the deep learning training task parameters include a neural network model, a data set, a training batch size, and a training way.

Optionally, selecting, according to the deep learning training task parameters, the GPU that has the minimum remaining resource quantity to work includes:
  selecting a GPU that satisfies conditions of the neural network model, the data set, and the batch size and has a minimum remaining resource quantity to work.

Optionally, selecting, according to the deep learning training task parameters, the GPU that satisfies the deep learning training task parameters and has the minimum remaining resource quantity from the server nodes to work includes:
  calculating, according to the deep learning training task parameters by means of a BestFit algorithm, a GPU that satisfies the deep learning training task parameters and has a minimum remaining resource quantity from server nodes to work.

Optionally, the single-machine type task includes a single-machine single-card task or a single-machine multi-card task.

Optionally, the multi-machine type task includes a Ring-AllReduce task or a PS-Worker task.

Optionally, the step of firstly selecting, according to the deep learning training task parameters, the GPU that satisfies the deep learning training task parameters and has the minimum remaining resource quantity from a single server node to work when the task type is the multi-machine type; and selecting the GPU that satisfies the deep learning training task parameters and has the minimum remaining resource quantity from the combination of the plurality of server nodes to work if there is no single server node that satisfies the condition includes:
  preferentially searching whether a GPU that satisfies the deep learning training task parameters and has a minimum remaining resource quantity exists from a single CPU sub-tree when the task type is the PS-Worker task; searching whether a GPU that satisfies the deep learning training task parameters and has a minimum remaining resource quantity exists from a single server node when no GPU that satisfies the deep learning training task parameters and has a minimum remaining resource quantity exists in the single CPU sub-tree; searching whether a GPU that satisfies the deep learning training task parameters and has a minimum remaining resource quantity exists from a plurality of server nodes when no GPU that satisfies the deep learning training task parameters and has a minimum remaining resource quantity exists in the single server node; and waiting for next dispatch when the GUPs do not exist.

Optionally, the step of firstly selecting, according to the deep learning training task parameters, the GPU that satisfies the deep learning training task parameters and has the minimum remaining resource quantity from the single server node to work when the task type is the multi-machine type;

and selecting the GPU that satisfies the deep learning training task parameters and has the minimum remaining resource quantity from the combination of the plurality of server nodes to work if there is no single server node that satisfies the condition includes:

preferentially searching whether a GPU that satisfies the deep learning training task parameters, has a minimum remaining resource quantity and may be of a closed-loop structure exists from a single server node when the task type is the Ring-AllReduce task; searching whether a GPU that satisfies the deep learning training task parameters, has a minimum remaining resource quantity and may be of a closed-loop structure exists from a plurality of server nodes if the GPU does not exist; and waiting for next dispatch if the GPUs do not exist.

Optionally, before obtaining the deep learning training task parameters input by the user, the method further includes:

constructing a resource topology structure for each server according to resources of each server, the resource topology structure being used for displaying a communication expense between GPU nodes in the server.

Optionally, before obtaining the deep learning training task parameters input by the user, the method further includes:

constructing a topology structure between server nodes according to a network interconnection way and a network topology between the server nodes, the topology structure being used for displaying a communication rate between the server nodes.

Optionally, the step of firstly selecting, according to the deep learning training task parameters, the GPU that satisfies the deep learning training task parameters and has the minimum remaining resource quantity from the single server node to work when the task type is the multi-machine type; and selecting the GPU that satisfies the deep learning training task parameters and has the minimum remaining resource quantity from the combination of the plurality of server nodes to work if there is no single server node that satisfies the condition further includes:

selecting a GPU that has the lowest communication expense from a single server node to work when the single server node that satisfies the condition exists; and selecting a group of GPUs that have the same communication rate and a minimum remaining resource quantity from a combination of a plurality of server nodes to work when no single server node that satisfies the condition exists.

Optionally, before obtaining the deep learning training task parameters input by the user, the method further includes:

dynamically updating resource usage statuses of various nodes and various GPU cards.

The present application further provides a working apparatus for a deep learning training task, including:

an acquisition unit configured to acquire deep learning training task parameters input by a user;

an identification unit configured to determine a type of the deep learning training task from the task parameters, the type of the deep learning training task comprising a single-machine type and a multi-machine type;

a first allocation unit configured to allocate GPU nodes for the training task; select, according to the deep learning training task parameters, a GPU that satisfies the deep learning training task parameters and has a minimum remaining resource quantity from a single server node to work when the task type is the single-machine type; and firstly select, according to the deep learning training task parameters, a GPU that satisfies the deep learning training task parameters and has a minimum remaining resource quantity from a single server node to work when the task type is the multi-machine type, and select a GPU that satisfies the deep learning training task parameters and has a minimum remaining resource quantity from a combination of a plurality of server nodes to work if there is no single server node that satisfies the condition; and a second allocation unit configured to allocate, according to a position of the GPU, a CPU having a shortest communication distance from the GPU to work.

Optionally, the deep learning training task parameters include a neural network model, a data set, a training batch size, and a training way.

Optionally, the first allocation unit includes:

a first selection unit configured to screen out a GPU that satisfies conditions of the neural network model, the data set, and the batch size and has a minimum remaining resource quantity.

Optionally, the first allocation unit includes:

a calculation unit configured to calculate, according to the deep learning training task parameters by means of a BestFit algorithm, a GPU that satisfies the deep learning training task parameters and has a minimum remaining resource quantity from server nodes to work.

Optionally, the single-machine type task includes a single-machine single-card task or a single-machine multi-card task.

Optionally, the multi-machine type task includes a multi-machine multi-card Ring-AllReduce task or a multi-machine multi-card PS-Worker task.

Optionally, the first allocation unit includes:

a PS-Worker type allocation unit configured to: preferentially search whether a GPU that satisfies the deep learning training task parameters and has a minimum remaining resource quantity exists from a single CPU sub-tree when the task type is the multi-machine multi-card PS-Worker task; search whether a GPU that satisfies the deep learning training task parameters and has a minimum remaining resource quantity exists from a single server node when no GPU that satisfies the deep learning training task parameters and has a minimum remaining resource quantity exists in the single CPU sub-tree; search whether a GPU that satisfies the deep learning training task parameters and has a minimum remaining resource quantity exists from a plurality of server nodes when no GPU that satisfies the deep learning training task parameters and has a minimum remaining resource quantity exists in the single server node; and wait for next dispatch when the GPUs do not exist.

Optionally, the first allocation unit includes:

a Ring-AllReduce type allocation unit configured to: preferentially search whether a GPU that satisfies the deep learning training task parameters, has a minimum remaining resource quantity and may be of a closed-loop structure exists from a single server node when the task type is the Ring-AllReduce task; search whether a GPU that satisfies the deep learning training task parameters, has a minimum remaining resource quantity and may be of a closed-loop structure exists from a plurality of server nodes if the GPU does not exist; and wait for next dispatch if the GPUs do not exist.

Optionally, before the acquisition unit, the apparatus further includes:

a first topology unit configured to construct, according to a resource status of each server, a resource topology structure for each server, the resource topology structure being used for displaying a communication expense between GPU nodes in the server.

Optionally, before the acquisition unit, the apparatus further includes:

a second topology unit configured to construct, according to a network interconnection way and a network topology between the server nodes, a topology structure between the server nodes, the topology structure being used for displaying a communication rate between the server nodes.

Optionally, the first allocation unit further includes:

a second selection unit configured to: select a GPU that has the lowest communication expense from a single server node to work when the training task is the multi-machine type and the single server node that satisfies the condition exists; and select a group of GPUs that have the same communication rate and a minimum remaining resource quantity from a combination of a plurality of server nodes to work when no single server node that satisfies the condition exists.

Optionally, before the acquisition unit, the apparatus further includes:

an updating unit configured to dynamically update resource usage statuses of various nodes and various GPU cards.

The method of the present application has the following advantages: by means of setting different GPU allocation strategies for the single-machine and multi-machine type tasks, GPU node resources are allocated for a training task according to the principle that a GPU has the minimum remaining resource quantity, so that the single-machine type tasks and the multi-machine type tasks can be processed at the same time while maximumly using GPU node resources in the same server cluster.

Meanwhile, in the present application, the topology structure is constructed for each server according to the resource status in the single server. The resource topology structure is used for displaying the communication expense between the GPU nodes in the servers. Meanwhile, the topology structure between the server nodes is constructed according to the network interconnection way and the network topology between the server nodes, and the topology structure is used for displaying the communication rate between the server nodes. Therefore, when the multi-machine type task needs to be processed, the GPU group that has the lowest communication expense and the highest communication rate can be selected to work.

BRIEF DESCRIPTION OF THE DRAWINGS

In order to describe the embodiments of the present application or the technical solutions in the prior art more clearly, drawings required to be used in the embodiments or the description of the prior art will be briefly introduced below. Obviously, the drawings in the description below are only some embodiments disclosed by the present application. Those of ordinary skill in the art also can acquire other drawings according to these drawings without creative work.

FIG. 4 is an adjacency matrix table of server nodes provided in Embodiment II of the present application;

FIG. 7 is a topology result table of server nodes provided in Embodiment II of the present application;

DETAILED DESCRIPTION

Embodiment I

Embodiment I of the present application provides a working method for a deep learning training task, which is specifically described below in combination with the accompanying drawings.

Figure 1:
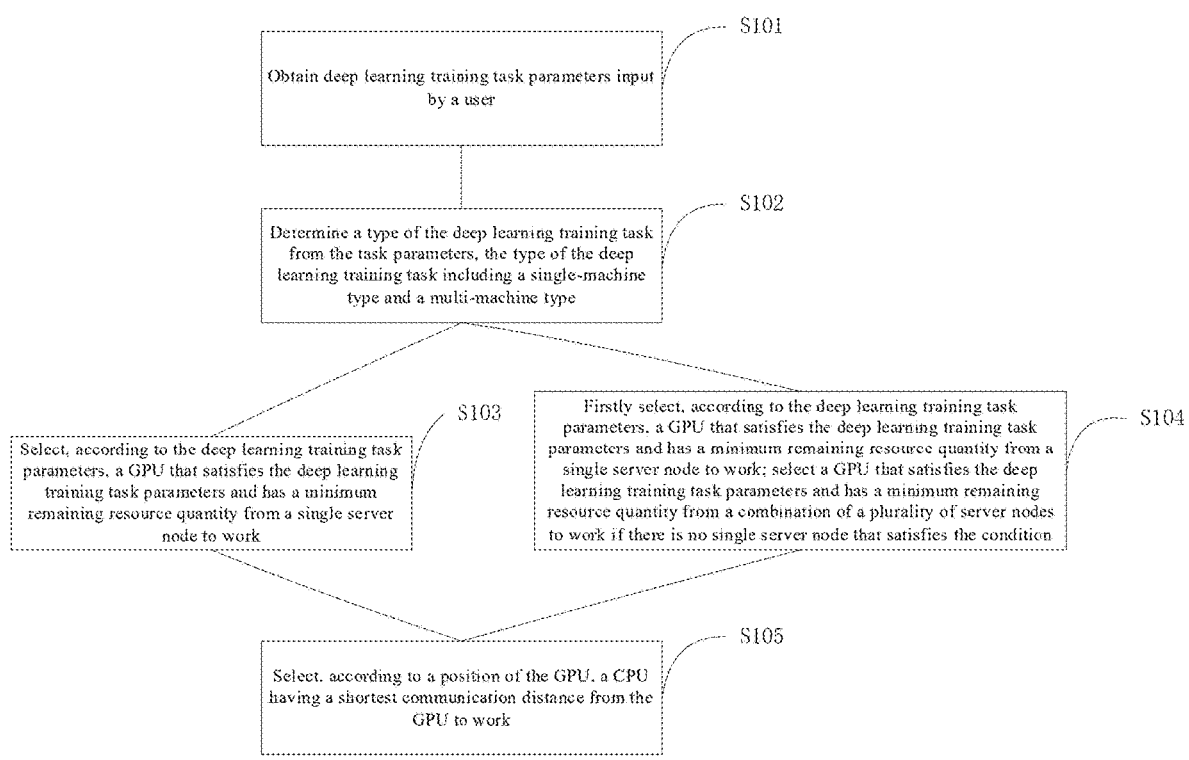
FIG. 1 is a flowchart of a working method for a deep learning training task provided in Embodiment I of the present application.

Referring to FIG. 1, FIG. 1 is a flowchart of a working method for a deep learning training task provided in Embodiment I of the present application.

The method of Embodiment I of the present application includes the following steps:

S101: deep learning training task parameters input by a user are obtained.

The deep learning training task parameters include a neural network model, a data set, a training batch size, and a training way. The neural network model, the data set, and the batch size decide a resource quantity of a GPU required, and the training way decides an allocation way of the GPU.

S102: a type of the deep learning training task is determined from the task parameters, wherein the type of the deep learning training task includes a single-machine type and a multi-machine type.

The single-machine type task includes a single-machine single-card type and a single-machine multi-card type. The single-machine single-card type means that in a training task, a single process is included, and only one GPU card of one physical server is used. The single-machine multi-card type means that in a training task, a single process is included, multiple GPU cards of the same one physical server are used.

The multi-machine type task includes a multi-machine multi-card Ring-AllReduce task or a multi-machine multi-card PS-Worker task. The multi-machine multi-card Ring-AllReduce task means that a PS node is 0 and a Worker node is more than 1. The multi-machine multi-card PS-Worker task means that a PS node is more than 1 and a Worker node is more than 0. A user designates a corresponding training type by means of setting the quantity of PS nodes and the quantity of Worker nodes.

S103: when the task type is the single-machine type, a GPU that satisfies the deep learning training task parameters and has a minimum remaining resource quantity is selected from a single server node to work according to the deep learning training task parameters.

When the task type is the single-machine type, the task only includes one process, and GPU resources only need to be searched from one physical server to be allocated, so that whether the allocation of the GPU resources is reasonable only needs to be considered.

The principle of allocating GPU resources for a task is that a GPU that has a minimum remaining resource quantity is selected on the premise that a resource quantity required by the task is satisfied, so that maximization of the utilization rate of the GPU resources can be ensured. The resource quantity required by the task is decided by the neural network model, the data set, and the batch size in the deep learning training task set by the user. A specific calculation method is:

video memory usage output by a model=output size of each layer*batchSize video memory usage of a model=video memory usage of parameter W+video memory usage of gradient+video memory usage of optimizer momentum (if it is an SGD+Momentum training way).

After the model is determined, the output size of each layer is determined:

$$out_w = \frac{(in_w + 2P - f)}{2} + 1$$

where out represents a width of a feature map obtained by calculation; $in_w$ represents an input size; P represents Padding; and f represents the size of a convolution kernel.

Total video memory usage=video memory usage of a model+video memory usage output by the model.

When the model is relatively small or the batch size is relatively large:

total video memory usage≈batch size*video memory usage of a single sample.

Therefore, after one model and a batch size are given, a determined video memory usage may be obtained. During dispatching, an enough video memory usage needs to be ensured.

After a video memory usage required by a task is obtained, the most appropriate GPU is found for allocation by using a BestFit algorithm. BestFit has the following specific content:

Pseudocode of the BestFit algorithm
Input: gpuMem: lowest demand for GPU video memory
  train Type: single-machine single-card (Type1), single-machine multi-card (Type2), multi-machi
  multi-machine multi-card Ring-AllReduce (Type4)
  gpuCount: quantity of GPU
  nodeList: resource usage statuses of various nodes of a cluster
Output: deviceMap<gpu_id, node_id>: gpu and host list
  1 function getDeviceMap (gpuMem, trainType, gpuCount, nodeList)
  2 deviceMap<gpu_id, node_id>←{ }
  3 lastCount←Max Integer
  4 if train Type==Type1 or train Type==Type2 then
    for i=1 to len (nodeList) do
      5 //determine whether the GPU video memory of this node meets the demand. It is as have the same model
      6 if nodeList [i].isGpuMemSufficent (gpuMem) then
      7      availableCount=len(nodeList[i].availableDevs)
      8 if availableCount>gpuCount and availableCount<lastCount then
      9 candidateId=nodeList[i].nodeId
      10 lastCount=availableCount
      11 end if
    12 end if
    13 end for
    14 return <node[candidateId].availabeDev[0], candidateId>
  endif S104: when the task type is the multi-machine type, a GPU that satisfies the deep learning training task parameters and has a minimum remaining resource quantity is firstly selected to work from a single server node to work according to the deep learning training task parameters; and if there is no single server node that satisfies the condition, a GPU that satisfies the deep learning training task parameters and has a minimum remaining resource quantity is selected from a combination of a plurality of server nodes to work.

When the task type is the multi-machine multi-card PS-Worker task, since this type of task is that information is transmitted upwards layer by layer, a GPU having a tree structure in a single physical server has a highest speed when executing this task. Therefore, whether a GPU that satisfies the deep learning training task parameters and has a minimum remaining resource quantity exists is searched from a single CPU sub-tree; when no GPU that satisfies the deep learning training task parameters and has a minimum remaining resource quantity exists in the single CPU sub-tree, whether a GPU that satisfies the deep learning training task parameters and has a minimum remaining resource quantity exists is searched from a single server node; when no GPU that satisfies the deep learning training task parameters and has a minimum remaining resource quantity exists in the single server node, whether a GPU that satisfies the deep learning training task parameters and has a minimum remaining resource quantity exists is searched from a plurality of server nodes; since a transmission speed between a plurality of servers is much higher than an information transmission speed between GPUs in a single server, when transmission is performed across servers, the speed advantage achieved by the tree structure can be ignored; and when the GPUs do not exist, it is considered that no appropriate resource is found in this dispatch, thereby waiting for next dispatch.

When the task type is the multi-machine multi-card Ring-All Reduce task, since this task type is a closed-loop information transmission task, whether a GPU that satisfies the deep learning training task parameters, has a minimum remaining resource quantity and may be of a closed-loop structure exists is preferentially searched from a single server node; if the GPU does not exist, whether a GPU that satisfies the deep learning training task parameters, has a minimum remaining resource quantity and may be made of a closed-loop structure exists is searched from a plurality of server nodes; if the GPUs do not exist, it is considered that no appropriate resource is found in this dispatch, thereby waiting for next dispatch.

S105: a CPU having a shortest communication distance from the GPU is selected to work according to a position of the GPU.

By this method for selecting CPU, it can be ensured that the information transmission speed is the highest, and the communication expense is the lowest.

Embodiment II

Embodiment II of the present application provides another method embodiment for a deep learning training task, which is specifically described below in combination with the accompanying drawings.

Figure 8:
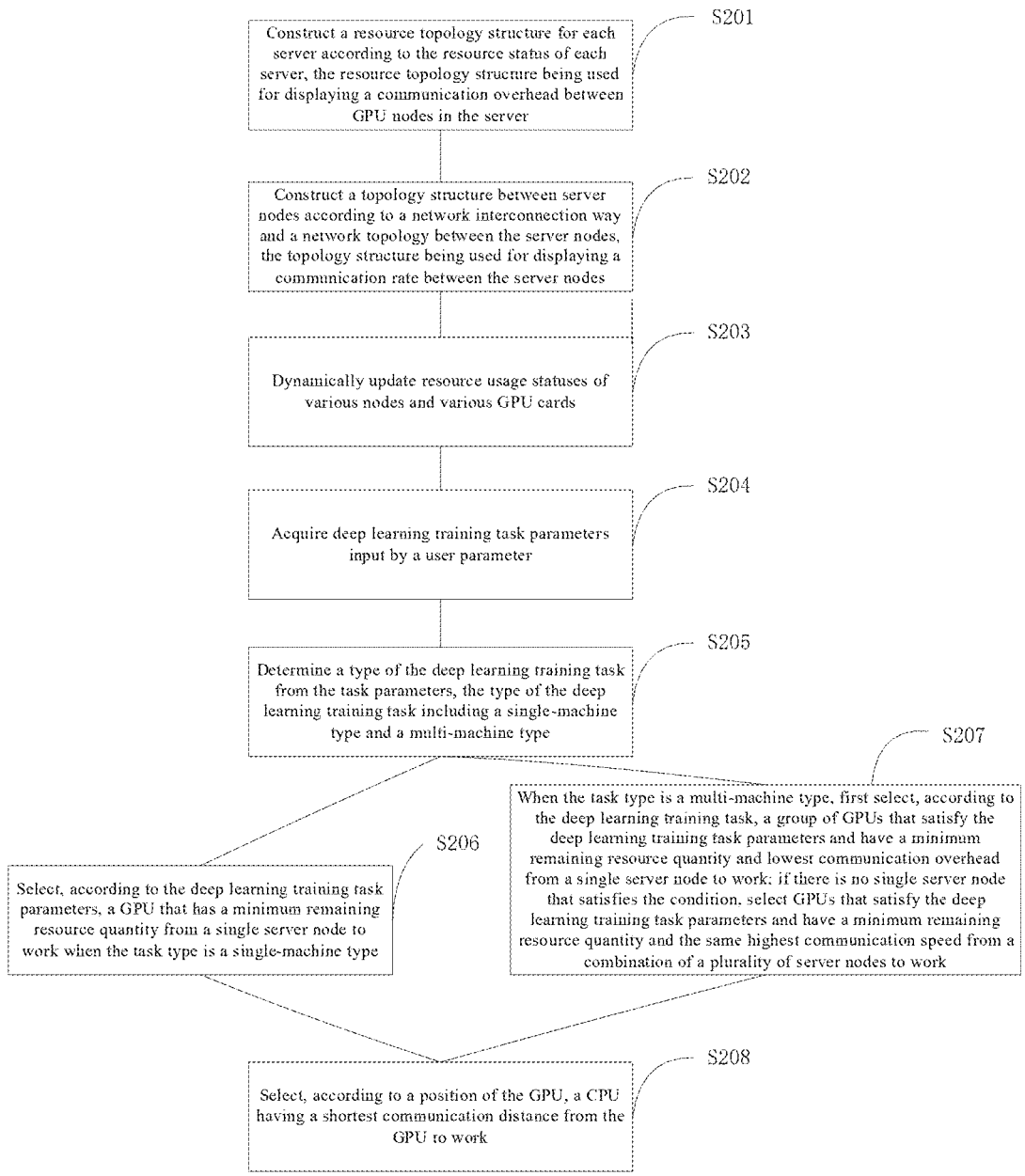
FIG. 8 is a flowchart of another embodiment of a working method for a deep learning training task provided in Embodiment II of the present application.

Referring to FIG. 8, FIG. 8 is a flowchart of a working method for a deep learning training task provided in Embodiment II of the present application.

The embodiment of the present application includes the following steps:

S201: a resource topology structure is constructed for each server according to resources of each server, the resource topology structure being used for displaying a communication expense between GPU nodes in the server.

Figure 2:
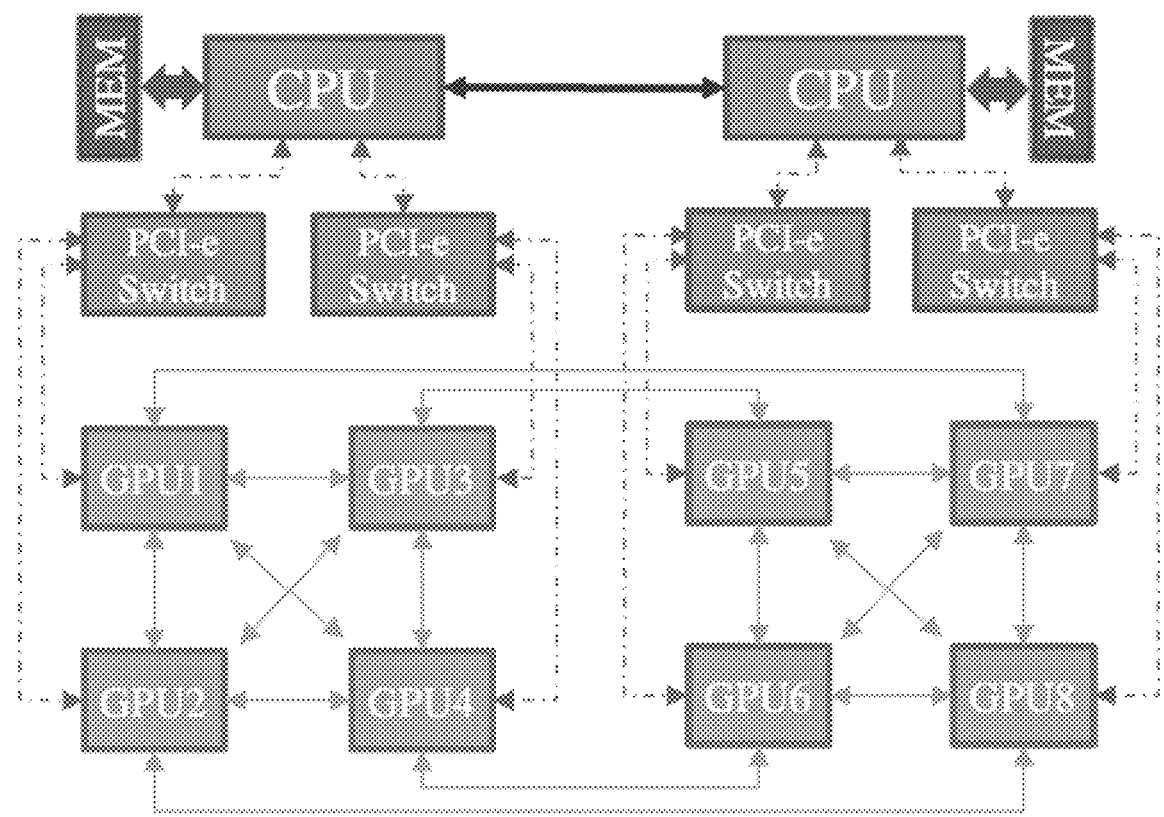
FIG. 2 is a server resource topology diagram provided in Embodiment II of the present application.
Figure 3:
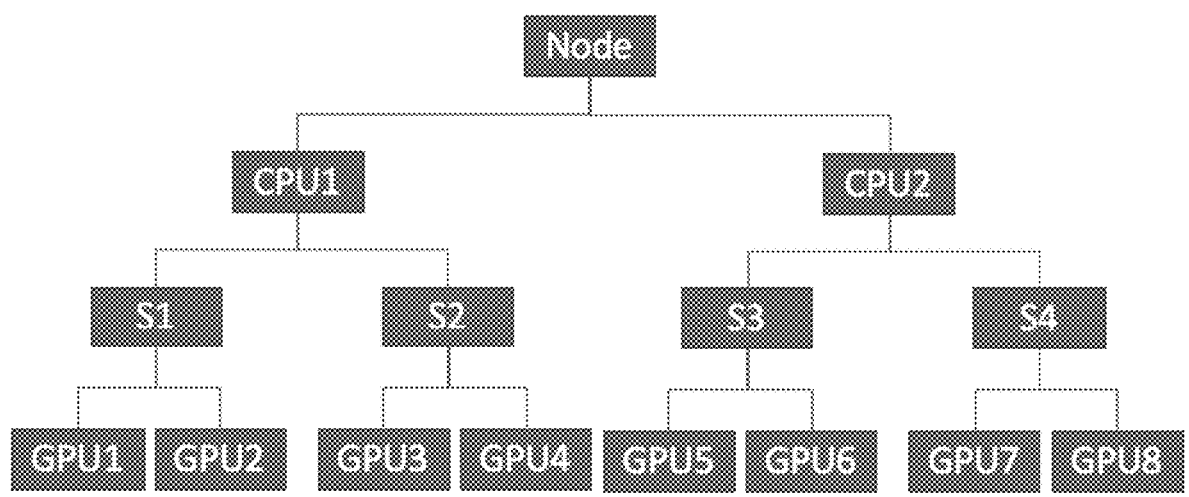
FIG. 3 is a server resource topology tree provided in Embodiment II of the present application.

As shown in FIG. 2, FIG. 2 is a resource topology structure diagram in a server; FIG. 3 is a topology tree graph generated according to the resource topology structure diagram; and FIG. 4 is an adjacency matrix table of nodes generated according to the resource topology structure diagram. For communication expenses of GPUs in different types of links within the same one server, the present application defines the following six levels:

SYS: communicate only across socket through QPI/UPI (i.e., across NUMA groups);

NODE: communication through different PCIe Host Bridges in the NUMA group;

PHB: communication only through one PCIe Host Bridge (this is the way of communication between CPUs and GPUs in the same group);

PXB: communication through multiple PCIe Switches, instead of a PCIe Host Bridge;

PIX: communication within the same one PCIe Switch; and

NV #: communication via NVLink.

The communication expense decreases from top to bottom in sequence: SYS has the largest overhead, and NVLink has the smallest communication expense. The most common connection types are: NV, NODE and SYS.

S202: a topology structure between server nodes is constructed according to a network interconnection way and a network topology between the server nodes, the topology structure being used for displaying a communication rate between the server nodes.

Figure 5:
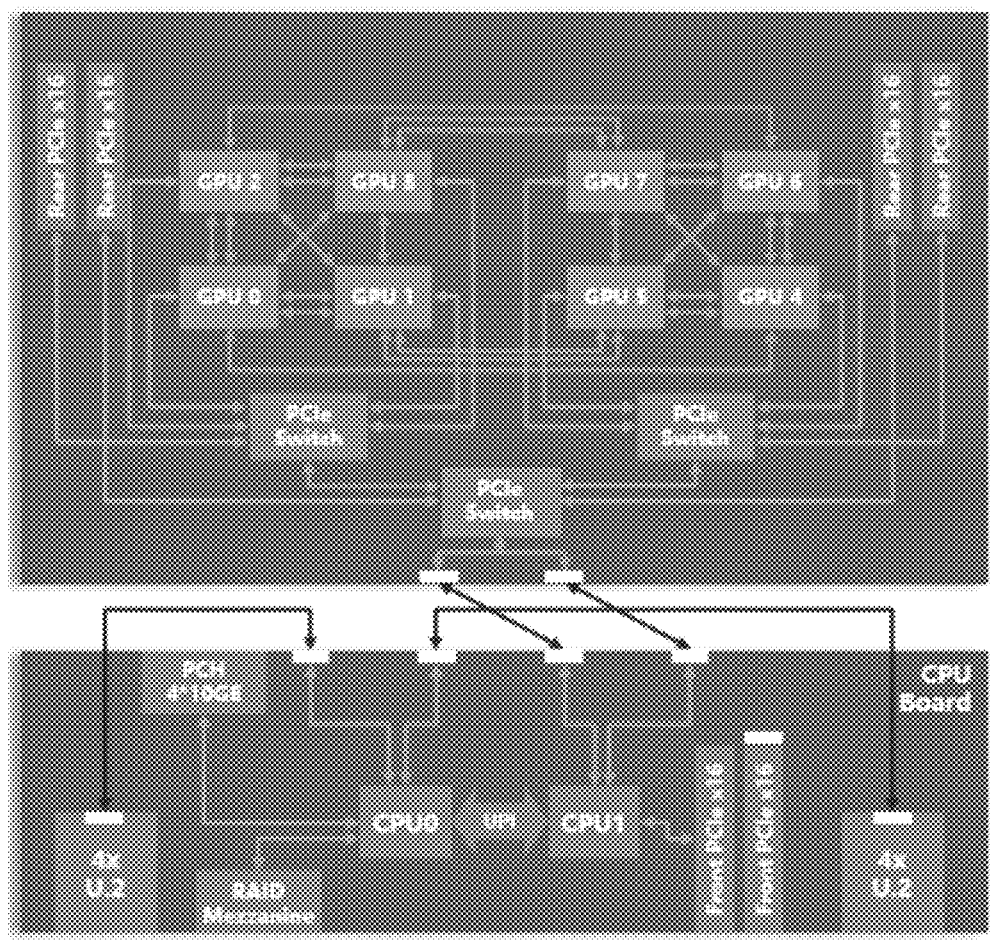
FIG. 5 is a topology structure diagram between server nodes provided in Embodiment II of the present application.
Figure 6:
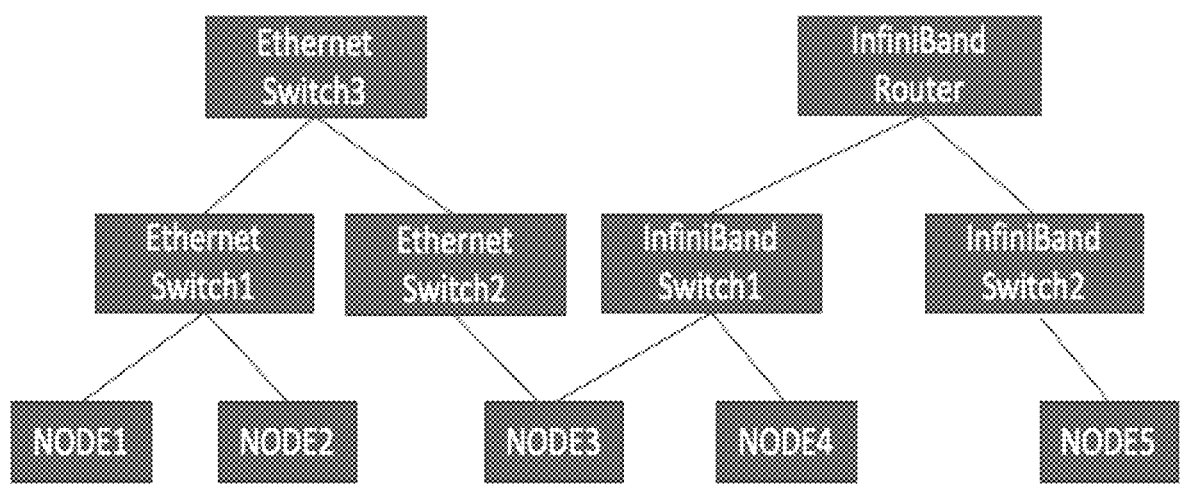
FIG. 6 is a topology tree diagram between server nodes provided in Embodiment II of the present application.

The topology structure between servers is as shown in FIG. 5. FIG. 6 is a digraph of a topology tree generated according to the topology structure; and FIG. 7 is a table of an adjacency matrix of nodes generated according to the topology structure. Communication rates between the servers are defined according to the following ways in the present application:

IB 1: two nodes may communicate through one level of IB switch;

IB 2: two nodes need to communicate through two levels of IB switches;

IB n: two nodes need to communicate through n levels of IB switches;

Ethernet 1: two nodes may communicate only through one switch (if two switches at the same level are stacked, they are considered as one switch);

Ethernet 2: two nodes need to communicate through two levels of switches;

Ethernet n: two nodes need to communicate through n levels of switches; and $n>2$, $n \in N+$. The communication expenses increase from top to bottom in sequence. The IB switch speed is higher than the Ethernet switch peed.

It can be known from FIG. 6 that NODE1 and NODE2 belong to the same one access switch. NODE2 and NODE3 pass through different access switches, but are connected through the same one aggregation switch. NODE3 and NODE4 are interconnected through the same IB switch. NODE4 and NODE5 are interconnected through an IB router. Therefore, an adjacency matrix diagram 7 may be obtained. X represents mutual disconnection. IB1 indicates the highest communication rate. The weight of IB1 is defined to be 1, and the weight of Ethernet 1 is defined to be 100. The weight of X is defined to be −1. The various weights increase in sequence, i.e., IB1<IB2<Ethernet1<Ethernet2 (namely, the weights are respectively 1, 2, 100, 101, and IB including 100 layers or more is not temporarily considered).

S203: resource usage statuses of various nodes and various GPU cards are dynamically updated.

This step aims to enable a system to timely find a GPU card that satisfies the conditions.

S204-S206 are the same as S101-S103.

S207: when the task type is the multi-machine type, a group of GPUs that satisfy the deep learning training task parameters and have a minimum remaining resource quantity and lowest communication expense is firstly selected from a single server node to work according to the deep learning training task; if there is no single server node that satisfies the condition, GPUs that satisfy the deep learning training task parameters and have a minimum remaining resource quantity and same lowest communication rate are selected from a combination of a plurality of server nodes to work.

Since the multi-machine training task includes a plurality of processes, information needs to be transmitted between the processes. When the multi-machine training task is carried out in a single server, a GPU group that has the lowest communication expense is selected for communication according to the above resource topology structure of the single server. When the multi-machine training task is carried out in a plurality of servers, the communication rate between the servers is much lower than the communication rate between resource nodes of the single server, so that at the moment, only how to save the communication rate between the servers is considered. One group of GPUs of the server nodes with the highest communication rate can be selected by means of the above topology structure of the server nodes. At the same time, when the multi-machine type task is the multi-machine multi-card PS-Worker task, since in the tree structure, each transmission can only be completed after the upward transmission process of each lower-layer GPU ends. When the multi-machine type task is the multi-machine multi-card Ring-AllReduce task, since in a ring structure, each transmission can only be completed after transmission of information from each GPU node to a next GPU node is completed. Therefore, according to a bucket effect, the time of one transmission of the two types of multi-machine type tasks depends on two GPU nodes with slowest transmission speed. Therefore, in the present application, when GPU nodes are selected, a group of GPU nodes with the same communication rate are selected, so as to reduce the waste of resources.

S208: a CPU having a shortest communication distance from the GPU is selected to work according to a position of the GPU.

Embodiment III

Based on the working method for a deep learning training task provided in the above-mentioned embodiment, Embodiment III of the present application further provides a working apparatus for a deep learning training task, which is specifically described below in combination with the accompanying drawings.

Figure 9:
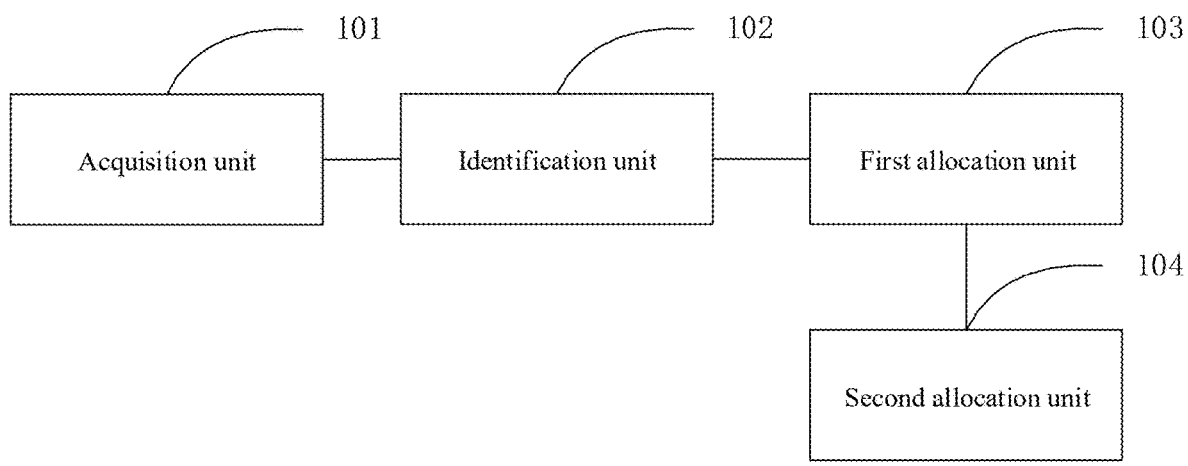
FIG. 9 is a structural block diagram of a working apparatus for a deep learning training task provided in Embodiment III of the present application.

As shown in FIG. 9, FIG. 9 is a working apparatus for a deep learning training task provided in Embodiment III of the present application. The apparatus includes:

101: an acquisition unit configured to acquire deep learning training task parameters input by a user;

102: an identification unit configured to determine a type of the deep learning training task from the task parameters, the type of the deep learning training task including a single-machine type and a multi-machine type;

103: a first allocation unit configured to allocate GPU nodes for the training task; select a GPU that satisfies the deep learning training task parameters and has a minimum remaining resource quantity from a single server node to work according to the deep learning training task parameters when the task type is the single-machine type; firstly select a GPU that satisfies the deep learning training task parameters and has a minimum remaining resource quantity from a single server node to work according to the deep learning training task parameters when the task type is the multi-machine type, and select a GPU that satisfies the deep learning training task parameters and has a minimum remaining resource quantity from a combination of a plurality of server nodes to work if there is no single server node that satisfies the condition; and

104: a second allocation unit configured to allocate, according to a position of the GPU, a CPU having a shortest communication distance from the GPU to work.

Those skilled in the art can clearly understand that, for the convenience and conciseness of description, the specific working process of the apparatus described above may refer to the corresponding process in the foregoing method embodiments, which will not be repeated here.

It should be understood that, in the present application, "at least one (item)" refers to one or more, and "a plurality of" refers to two or more. "And/or" is used to describe the relationship between related objects, indicating that there can be three kinds of relationships. For example, "A and/or B" can mean: only A exists, only B exists, or both A and B exist, where A and B can be singular or plural. The character "/" generally indicates that the associated objects are in an "or" relationship. "At least one of item (piece) below" or its similar expression refers to any combination of these items, including any combination of single item (piece) or plural items (pieces). For example, at least one of a, b, or c can mean: a, b, c, "a and b", "a and c", "b and c", or "a and b and c", where a, b, c can be singular or plural.

The embodiments in the specification are described in a progressive way. For same or similar parts of the embodiments, mutual references can be made to the implementations. Each embodiment focuses on a difference from other embodiments. In particular, for the apparatus embodiment, since it is basically similar to the method embodiment, the description is relatively simple, and reference may be made to the partial description of the method embodiment for related parts. The apparatus embodiment described above is merely illustrative. The units and modules described as separate components may or may not be physically separated. In addition, part or all of the units may also be selected according to actual needs to achieve the objectives of the solutions of the embodiments. Those of ordinary skill in the art can understand and implement the solutions without creative effort.

The above describes specific implementation modes of the present application. It should be noted that those of ordinary skill in the art can further make several improvements and modifications without departing from the principles of the present application. These improvements and modifications shall also all fall within the protection scope of the present application.

What is claimed is:

1. A working method for a deep learning training task, implemented by a server cluster comprising a plurality of server nodes each comprising a plurality of graphical processing units (GPUs) communicationally connected to central processing unit (CPU) sub-trees each comprising a plurality of CPUs, wherein the method comprises:

generating first digital files of a resource topology structure diagram, a topology tree graph and an adjacency matrix table according to resources of each of the server nodes, the generated first digital files being used for displaying a communication expense between GPU nodes in the server node; and generating second digital files of a topology structure diagram, a topology tree graph and an adjacency matrix table according to a network interconnection way and a network topology between the server nodes, the generated second digital files being used for displaying a communication rate between the server nodes;

dynamically updating resource usage statuses of various nodes and various GPU cards in the generated first digital files and the generated second digital files;

obtaining deep learning training task parameters input by a user;

determining a type of the deep learning training task from the task parameters, the type of the deep learning training task comprising a single-machine type and a multi-machine type, wherein the multi-machine type task comprises a multi-machine multi-card Ring-All-Reduce task or a multi-machine multi-card PS-Worker task;

selecting, according to the deep learning training task parameters, a first plurality of GPUs that satisfy a first condition of the deep learning training task parameters and has a minimum remaining resource quantity from a single server node to carry out the deep learning training task when the task type is the single-machine type;

firstly selecting, according to the deep learning training task parameters, a second plurality of GPUs that satisfy a second condition of the deep learning training task parameters and has a minimum remaining resource quantity from a single server node to carry out the deep learning training task when the task type is the multi-machine type; or selecting a third plurality of GPUs that satisfy a third condition of the deep learning training task parameters and has a minimum remaining resource quantity from a combination of a plurality of server nodes to carry out the deep learning training task when there is no single server node that satisfies the second condition, comprising:

searching whether the second plurality of GPUs exists in a single CPU sub-tree;

searching whether the third plurality of GPUs exists in the single CPU sub-tree;

searching whether the third plurality of GPUs exists in the single server node when the third plurality of GPUs does not exist in the single CPU sub-tree; and waiting for a next dispatch when none of the second plurality of GPUs and the third plurality of GPUs exist; and selecting, according to a position of each selected plurality of GPUs, a CPU having a shortest communication distance from each selected plurality of GPUs to carry out the deep learning training task, so that information transmission speed is the highest and communication expense is the lowest while maximumly using GPU node resources in the server cluster when carrying out the deep learning training task.

2. The method according to claim 1, wherein, the deep learning training task parameters comprise a neural network model, a data set, a training batch size, and a training way.

3. The method according to claim 2, wherein, the step of selecting, according to the deep learning training task parameters, the first plurality of GPUs that satisfy the first condition of the deep learning training task parameters and has the minimum remaining resource quantity from the single server node to carry out the deep learning training task when the task type is the single-machine type comprises:

selecting one or more GPUs that satisfy conditions of the neural network model, the data set, and the batch size and has a minimum remaining resource quantity to carry out the deep learning training task when the task type is the single-machine type.

4. The method according to claim 1, wherein, the step of selecting, according to the deep learning training task parameters, the first plurality of GPUs that satisfy the first condition of the deep learning training task parameters and has the minimum remaining resource quantity from the single server node to carry out the deep learning training task when the task type is the single-machine type, comprises:

calculating, according to the deep learning training task parameters by means of a BestFit algorithm, one or more GPUs that satisfy the first condition of the deep learning training task parameters and has the minimum remaining resource quantity from the single server node to carry out the deep learning training task when the task type is the single-machine type.

5. The method according to claim 1, wherein, the single-machine type task comprises a single-machine single-card task or a single-machine multi-card task.

6. The method according to claim 1, wherein, the step of firstly selecting, according to the deep learning training task parameters, a second plurality of GPUs that satisfy a second condition of the deep learning training task parameters and has a minimum remaining resource quantity from the single server node to carry out the deep learning training task when the task type is the multi-machine type; and selecting a third plurality of GPUs that satisfy a third condition of the deep learning training task parameters and has a minimum remaining resource quantity from a combination of a plurality of server nodes to carry out the deep learning training task when there is no single server node that satisfies the second condition, further comprises:

preferentially searching whether the second plurality of GPUs having a closed-loop structure exists in the single server node;

searching whether the third plurality of GPUs having a closed-loop structure exists in the plurality of server nodes when the second plurality of GPUs does not exist; and waiting for next dispatch when the second plurality of GPUs and the third plurality of GPUs do not exist.

7. The method according to claim 1, wherein, the step of firstly selecting, according to the deep learning training task parameters, a second plurality of GPUs that satisfy a second condition of the deep learning training task parameters and has a minimum remaining resource quantity from the single server node to carry out the deep learning training task when the task type is the multi-machine type; and selecting a third plurality of GPUs that satisfy a third condition of the deep learning training task parameters and has a minimum remaining resource quantity from a combination of a plurality of server nodes to carry out the deep learning training task when there is no single server node that satisfies the second condition, further comprises:

selecting the second plurality of GPUs that has the lowest communication expense from the single server node to carry out the deep learning training task when the single server node that satisfies the condition exists; or selecting a group of GPUs from the third plurality of GPUs that have a same and fast communication rate from the combination of the plurality of server nodes to carry out the deep learning training task when no single server node that satisfies the condition exists.

\* \* \* \* \*